(12) United States Patent
Maule

(10) Patent No.: US 6,212,035 B1
(45) Date of Patent: Apr. 3, 2001

(54) MAGNETIC TAPE APPARATUS HAVING A MULTI-FUNCTION MOTOR WHICH DRIVES A HELICAL SCANNING DRUM CLEANING ASSEMBLY

(75) Inventor: Hugo Maule, Chepstow (GB)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/363,030

(22) Filed: Jul. 29, 1999

(30) Foreign Application Priority Data

Jul. 29, 1998 (GB) .................................................. 9816397

(51) Int. Cl.$^7$ ...................................................... G11B 5/41
(52) U.S. Cl. .............................................................. 360/128
(58) Field of Search .............................................. 360/128

(56) References Cited

U.S. PATENT DOCUMENTS

| | | | |
|---|---|---|---|
| 5,729,398 | * 3/1998 | Nouchi et al. | 360/69 |
| 5,745,320 | * 4/1998 | Ohshima et al. | 360/128 |
| 5,835,317 | * 11/1998 | Kawakami et al. | 360/128 |
| 5,949,629 | * 9/1999 | Suzuki et al. | 360/128 |
| 6,043,949 | * 3/2000 | Sakui | 360/69 |
| 6,069,776 | * 5/2000 | Hasegawa et al. | 360/128 |

FOREIGN PATENT DOCUMENTS 0 782 136 A1    7/1997   (EP) .

\* cited by examiner

*Primary Examiner*—Jefferson Evans

(57) ABSTRACT

Tape recording and playback apparatus (10) including tape head cleaning assembly (80–92) for intermittent cleaning of one or more tape head(s) mounted in the periphery (18) of a helical scanning drum (12) forming part of the apparatus (10). Loading of a cassette (24) carrying the tape, extension of the tape (20) by movable guides (44,46) into contact with the drum periphery (18), and movement of a pinch roller (50) are controlled by a motor-driven cam (40) as described in EP0782136-A1. Instead of also using the prior art cam to control tape tension, this is now done by dynamic braking of the motor (30) for the tape supply reel (26). In accordance with the invention, the fourth control function of the prior art cam is now utilised for selective mechanical actuation of a swinging arm (82) on which is mounted an abrasive cleaning wheel (80). Rotation of the control cam (40) to its "fourth function" position allows the arm (82) to pivot and thus brings the abrasive wheel (80) into temporary contact with the periphery (18) of the helical scanning drum (12) so as to remove debris clogging the tape head(s). High performance of the data recording/playback unit (10) is maintained by the inventive adaptation of existing hardware (40) to effect intermittent operation of a tape head cleaner (80) built-in to the unit (10).

17 Claims, 1 Drawing Sheet

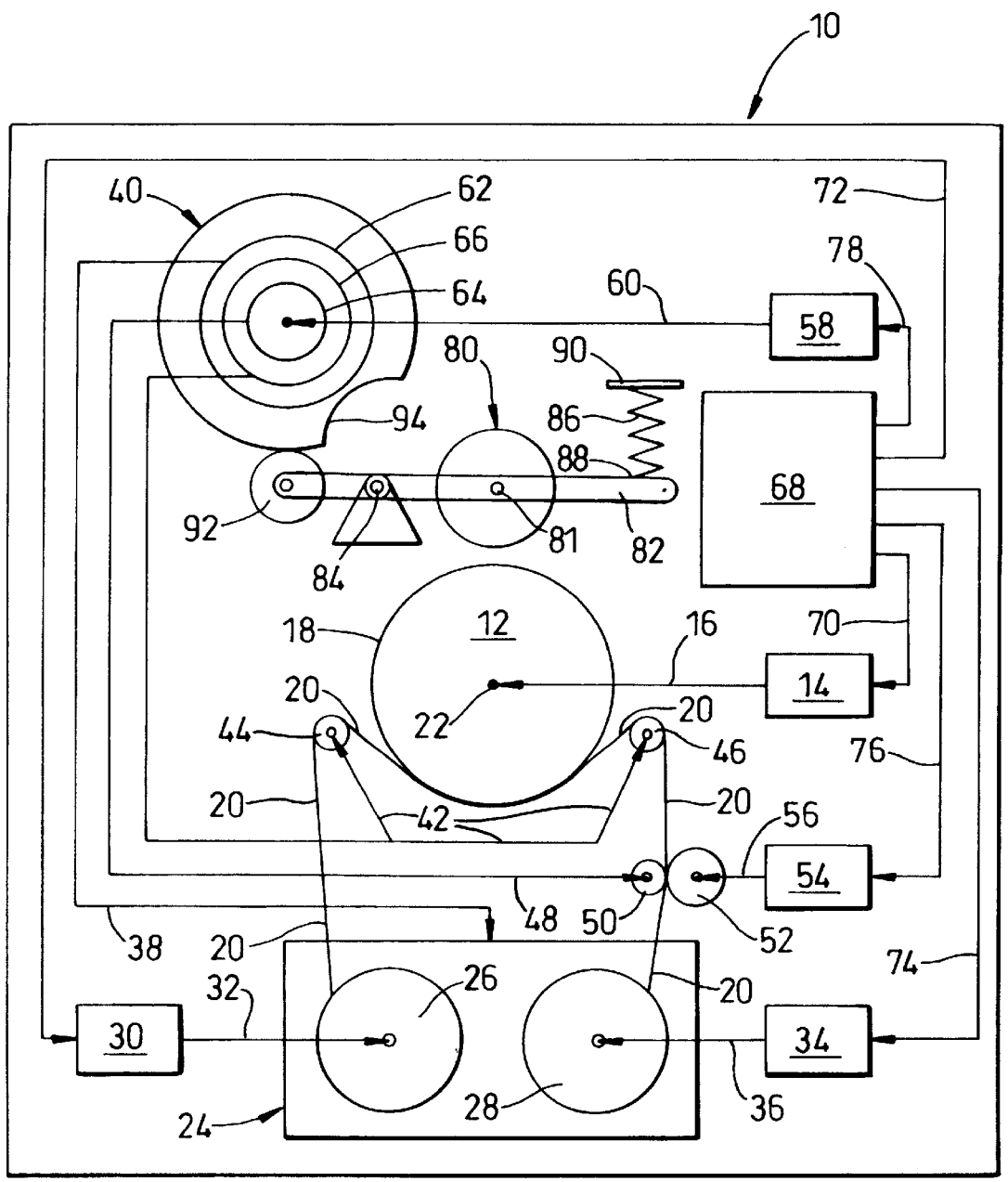

MAGNETIC TAPE APPARATUS HAVING A MULTI-FUNCTION MOTOR WHICH DRIVES A HELICAL SCANNING DRUM CLEANING ASSEMBLY

FIELD OF THE INVENTION

This invention relates to tape recording and playback apparatus, and relates more particularly but not exclusively to the intermittent cleaning of helical scanning drums utilised in tape recording and playback apparatus.

DESCRIPTION OF PRIOR ART

It is well known to utilise magnetic tape for recording and replaying high frequency signals that may represent (for example) video pictures or computer data (i.e., analogue data, digital data, or a mixture of analogue and digital data). Such magnetic tape is commonly held on and extends between two rotatable reels normally housed within a tape cassette. A form of electromagnetic transducer known as a tape head is utilised for writing signals onto magnetic tape ("write" operation) or for reading previously recorded signals ("read" operation). Both read and write operations require relative movement between the magnetic tape and the tape head, and the greater the bandwidth requirements (i.e. the greater the highest signal frequency to be dealt with), the greater must be such relative velocity. For directly recorded audio-frequency signals (e.g. music) it is sufficient for the tape head(s) to be stationary, and for the tape to be wound past the tape head(s) at a mechanically undemanding velocity. However, for writing and reading signals of a much higher frequency, e.g. video signals and computer data signals, it is known to mount one or several tape heads in the periphery of a drum which is rotated about a central axis that is skewed with respect to a notional perpendicular through the plane of tape movement such as to give the tape head(s) a component of movement transverse to the length of the tape (which passes along a path that extends around part of the periphery of the rotating drum), as well as giving the tape head(s) a component of movement along the tape. Such relative movement is known as "helical scanning" while the combination of tape head(s) and rotating drum is known as a "helical scanning drum".

On the one hand, high-frequency data signals require a very high fidelity of writing and reading if interference and other errors are to be avoided, but on the other hand, the high velocity rubbing contact between tape and tape heads tends to result in the accumulation of scraped-off magnetic recording medium and/or other debris (e.g., airborne dust and dirt) on the tape heads. Such accumulations of debris degrade the performance of the tape heads, and must be avoided, or removed before worsening performance reaches an unacceptable level. Continuous cleaning of the periphery of a helical scanning drum is likely to cause excessive friction and wear, and/or to be ineffective if contact pressure of the cleaner on the drum is reduced in an attempt to avoid excessive friction and wear.

SUMMARY OF THE INVENTION

According to a first aspect of the present invention there is provided tape recording and playback apparatus including a cleaning assembly having a cleaning means operable to clean the periphery of a helical scanning drum of said apparatus by contact therewith, the cleaning means being mounted for controllable movement into and out of contact with the periphery of the helical scanning drum, the assembly further comprising contact control means coupled to the cleaning means for controlling movement of the cleaning means into contact with the periphery of the helical scanning drum, the contact control means comprising a cam means including a cam-driving motor and a motor-driven cam, said cam means being operable to displace the cleaning means to make contact with the periphery of the helical scanning drum, said motor being a multi-function motor additionally utilisable for one or more of the additional functions of motor-driven loading of a tape cassette holding a length of magnetic tape, dragging a length of tape from the cassette into contact with the periphery of the helical scanning drum, and moving a pinch roller to pinch a portion of the tape against a tape-driving capstan forming part of the apparatus, such movements being effected by mechanisms coupled with the motor-driven cam, characterised in that said cam means is operable to displace the cleaning means independently of said additional functions.

Preferably said cam means is arranged to operate intermittently to cause the cleaning means to make intermittent contact with the periphery of the helical scanning drum.

The cleaning means may be mounted on movable mounting means comprising an arm or a bracket which is rotatable and/or slidable and which also comprises a cam follower co-operating with the cam means to be controllably moved thereby. The cam-driving motor is preferably a rotary electric motor having a rotatable output shaft, and the motor-driven cam is preferably a rotary cam directly connected to the rotatable output shaft of the cam-driving motor to be directly rotated thereby in use of the cleaning assembly.

The cleaning means is preferably an abrasive cleaning means operable to clean the periphery of the helical scanning drum by a combination of physical contact therewith and relative movement therebetween in use of the cleaning assembly. The abrasive cleaning means is preferably an abrasive wheel mounted for free rotation about a wheel axis in use of the cleaning assembly.

According to a second aspect of the present invention there is provided a method of operating apparatus according to the first aspect of the present invention, the method comprising the steps of controlling movement of the cleaning means into contact with the periphery of the helical scanning drum upon each occurrence of a selected one or more of the following conditions:
(a) upon the loading and/or unloading of a tape cassette;
(b) at substantially regular intervals of time;
(c) upon a data error being detected during a write cycle and/or during a read cycle;
(d) upon receipt of a manually originated command signal.

Preferably, movement of the cleaning means is such as to effect temporary or intermittent contact with the helical scanning drum.

BRIEF DESCRIPTION OF THE DRAWING

An embodiment of the invention will now be described by way of example only, with reference to the accompanying drawing, the sole FIGURE of which is a schematic representation of relevant parts of a preferred embodiment.

DETAILED DESCRIPTION OF THE PREFERRED EMBODIMENT

The drawing is a simplified and highly schematic diagram of mechanical and electromechanical parts of the preferred embodiment; electronics related to data writing and data reading are omitted for the sake of clarity, and because they are not immediately relevant to the invention. As used below, the term "apparatus" refers to a tape recording and playback apparatus for writing data onto magnetic tape and reading data from magnetic tape, the data being digital data, analogue data, or a mixture of digital and analogue data.

Referring to the drawing, a tape recording and playback apparatus 10 has a helical scanning drum 12 rotatable by an electric motor 14 via a mechanical drive 16. The drum 12 has one or more tape heads (not shown) mounted in the periphery 18 of the drum 12 to read and/or write data or other signals from and/or to magnetic tape 20 held against and wrapped part-way around the drum periphery 18. The helical scanning drum 12 and its drive 14 and 16 are of known form, with the drum 12 being rotated during read/write operation by the motor 14 via the mechanical drive 16, the drum 12 rotating about an central drum axis 22 which is skewed slightly away from right angles to the notional plane occupied by the portion of the tape 20 wrapped around the drum periphery 18, such that the tape head(s) scan the peripherally-wrapped portion of the tape 20 with a movement that includes both longitudinal and transverse components, i.e. a form of scanning known as "helical scanning".

The magnetic tape 20 is supplied from and returned to a tape cassette 24 of known form within which are mounted a rotatable supply reel 26 and a rotatable take-up reel 28. The supply reel 26 is driven or dynamically braked by an electric motor 30 via a mechanical drive 32. The take-up reel 28 is driven or dynamically braked by an electric motor 34 via a mechanical drive 36. (Alternatively, the take-up reel 28 can be a permanent part of the apparatus 10, with the tape 20 being supplied in a one-reel cartridge (not shown), the apparatus 10 comprising means (not shown) of known form to pull a tape leader from the cartridge to the take-up reel 28).

When the tape cassette 24 is first loaded into the apparatus 10, the reels 26 and 28 are uncoupled from their respective drives 32 and 36, and magnetic tape 20 initially extends between the reels 26 and 28 along a path (not depicted) not projecting beyond the outline of the cassette housing. Loading of the cassette 24 initiates (e.g. by means of a microswitch, not shown) the pulling of the cassette 24 within the tape apparatus 10 and engagement of the reels 26 and 28 with their respective drives 32 and 36, the appropriate cassette movements being effected by a first mechanical linkage 38 actuated by a motor-driven cam 40 which will be detailed subsequently. Next, the cam 40 operates a second mechanical linkage 42 to cause a pair of movable tape guides 44 and 46 to hook the tape 20 between the reels 26 and 28 from its initial position entirely within the cassette 24 and, by suitable movement of the guides 44 and 46, to extend the inter-reel portion of the tape 20 until the tape 20 is wrapped part-way around the drum periphery 18. Finally, the cam 40 operates a third mechanical linkage 48 to cause a pinch roller 50 to pinch the newly extended tape 20 against the periphery of a tape-driving capstan 52 driven by a capstan motor 54 via a mechanical drive 56. The magnetic tape 20 is now ready to be written onto and/or read from by means of the tape head(s) in the periphery 18 of the helical scanning drum 12.

In the drawing, the motor-driven cam 40 is schematically depicted as a rotary cam bi-directionally rotated by a cam-driving motor 58 via a mechanical drive 60. The first, second and third mechanical linkages 38, 42 and 48 couple to respective cam tracks 62, 64 and 66 formed on the cam 40 (these cam tracks being depicted in the drawing as simple circles rather than the mechanically complex shapes referred to below).

The various motors 14, 30, 34, 54 and 58 are operated by and under the control of a control unit 68 which internally incorporates a controllable power supply (not depicted separately) that supplies controlled power to requisite ones of the motors (via respective power connections 70, 72, 74, 76 and 78) in a manner to cause each motor to operate as and when required (as may be ascertained from the operational description given subsequently).

Other than for certain differences which will be detailed subsequently, the structure and operation of the cam 40 and of its associated cam-actuated mechanisms are as described in published European Patent Application EP0782136-A1 (wherein the equivalent cam is coincidentally referenced "40") the contents of which being incorporated herein by reference.

It is to be particularly noted that the cam motor in EP0782136-A1 is a multi-function motor which serves (through the intermediary of the cam 40 and its associated mechanisms) for cassette loading, tape loading, pinch roller actuation, and reel brake actuation (referred to as "pressing force varying") for controlled variation of back tension in the tape. From the description of the latter function (see columns 5–16 of EP0782136-A1), it will be seen that the latter function is independent of the first three functions. This functional independence is preserved in the adaptation of the cam and cam motor of EP0782136-A1 to the present invention, as will subsequently be detailed.

Whereas EP0782136-A1 was concerned with use of its cam to control the tension of tape being payed-out from its tape supply reel, in the present invention tape tension is controlled by controlled dynamic braking of the respective reel motor. Specifically, when tape is being payed-out from the supply reel 26 to be scanned by the drum 12 and taken up on the reel 28 driven by the motor 34 during normal operation of the apparatus 10, tension in the tape 20 between the cassette 24 and the drum 12 is controlled by suitable energisation of the motor 30 as determined by the combined control unit/power supply 68, in a manner to cause the motor 30 to provide an appropriate level of dynamic braking through a combination of reverse torque (or drag) and forward motion (i.e. rotation of the motor 30 allowing the reel 26 to turn clockwise as depicted in the drawing so that tape feeds from the reel 26 to the drum 12 via the guide 44). Should tape tension require to be controlled during reverse motion of the tape 20, the motor 34 would be energised to provide dynamic braking.

Since tape tension is controlled in the present invention by the tape reel motors, this frees the cam system adapted from EP0782136-A1 from its previous requirement to provide controlled reel braking to achieve tape tension, and allows the freed-up cam function to operate the drum cleaning system which will now be detailed.

The means by which the periphery 18 of the helical scanning drum 12 is cleaned is an abrasive wheel 80 which is rotatably mounted on an arm 82 which is, in turn, pivotally mounted on a pivot 84 anchored at a suitable location inside the apparatus 10. The wheel 80 is formed as a freely rotatable hub having several flaps of abrasive-coated fabric (e.g. emery cloth) each attached at one edge to the periphery of the hub so as to be carried round by rotation of the hub but otherwise to have free movement radially in and out from the hub. The arm 82 is pivotally biased by a spring 86 having one end 88 bearing against the arm 82 and the other end 90 anchored against a suitable fixed location inside the apparatus 10. The spring 86 is disposed in a manner to bias the arm 82 in a direction which tends to pivot the arm 82 such as to bring the abrasive wheel 80 against the drum periphery 18. However, the abrasive wheel 80 is normally held out of all direct contact with any part of the drum 12 by means of a cam follower 92 mounted on the arm 82 and bearing against the cam 40 such that the interaction of the cam 40 and the cam follower 92 hold the arm 82, against the bias of the spring 86, in a pivoted position in which the wheel 80 is entirely clear of the drum 12.

The form of the cam follower 92 and of the co-operating parts of the cam 40 can take any suitable form, and are shown by way of example with the cam follower 92 as a wheel which is rotatably mounted on a free end of the arm 82, the wheel 92 bearing against the periphery of the rotatable cam 40 which is circular apart from a reduced-radius portion 94 about to be described.

Operation of the previously referred-to mechanisms by which the cassette 24 is loaded, the tape 20 is hooked and guided against the drum 12, and the tape 20 is pinched against the capstan 52 by movement of the pinch roller 50, is caused by rotational interaction of the cam tracks 62, 64 and 66 with the linkage mechanisms 38, 42 and 48 as previously described and as more fully detailed in EP0782136-A1. Such interaction is brought about by suitable rotation of the cam 40 (as driven by the motor 58 under the control of the control unit 68), and corresponds to the rotational cam positions "40-1", "40-2", and "40-3" illustrated in FIG. 4 of EP0782136-A1. In the present invention, such rotational cam positions keep the reduced-radius portion 94 of the periphery of the cam 40 away from the cam follower 92, and maintain the cam follower 92 against the constant-radius portion of the cam periphery such that the abrasive wheel 80 is held away from the drum periphery 18.

When it is desired to clean the tape head(s) by means of contact of the abrasive wheel 80 with the drum periphery 18 (wherein the tape head(s) is/are mounted), the cam 40 is controllably rotated to bring the reduced-radius portion 94 angularly into alignment with the cam follower 92. This allows the cam follower 92 to reduce its radial separation from the rotational centre of the cam 40, so allowing the spring 86 to pivot the arm 82 about the pivot 84 (in a clockwise direction as depicted in the drawing) and thus to allow the abrasive wheel 80 to swing into contact with the periphery 18 of the helical scanning drum 12. (The rotational position of the cam 40 now corresponds to the rotational position "40-4" shown in FIG. 4 of EP0782136-A1, except that instead of the prior art function of tape tensioning, the different function of tape head cleaning is now being controlled by the cam).

During the cleaning process, rotation of the helical scanning drum 12 is maintained by suitable energisation of the drum motor 14 from the control unit/power supply 68, such that the drum 12 rotates past the abrasive wheel 80 at the same time as the drum periphery is in physical contact with the wheel 80. Thus the rotating drum 12 tends to spin the abrasive wheel 80. Abrasive cleaning of the drum periphery 18 may be enhanced by a transverse scrubbing component of relative motion if the rotational axis 81 of the abrasive wheel 80 is suitably skewed with respect to the drum axis 22.

After a suitable interval (e.g. a few seconds), the cam 40 is again rotated (onwards or in reverse as deemed suitable) such as angularly to displace the reduced-radius portion 94 away from the cam follower 92 and to bring the constant-radius portions of the periphery of the cam 40 back under the cam follower 92, so forcing the arm 82 to pivot (anti-clockwise as depicted in the drawing) against the biasing force of the spring 86 thus to lift the abrasive wheel 80 out of contact with the periphery 18 of the helical scanning drum 12 and so terminate the tape head cleaning cycle.

Performance of the tape head cleaning cycle can be arranged to occur at suitable intervals, preferably such as to ensure a minimum standard of tape head cleanliness (freedom from clogging) without subjecting the tape head(s) to excessive abrasion. Cleaning can be arranged to occur automatically upon each occasion that a tape cassette is loaded into the apparatus, or at suitable regular intervals of time, or upon the detection of (or upon the suspicion of) degraded tape head performance (e.g. as signified by the occurrence of a data read/write error), or upon any selected combination of such occasions. Additionally or alternatively, tape head cleaning can be initiated by a manual control signal.

The arm 82 which mounts the cleaning wheel 80 and the cam follower 92 is schematically depicted in the drawing as a straight arm with a fulcrum located between the ends of the arms. In practical embodiments, the arm may have any suitable shape which suitably disposes arm-mounted components, and the arm may be slidable as well as or instead of being pivotable. The spring 86 is depicted as an example only of means to bias the cleaning wheel 80 out of contact with the helical scanning drum except during cleaning, but actual biasing means can take any suitable form, e.g. a torsion spring (not shown) acting on the arm 82 at its pivot 84. Any suitable form of cleaning means can be employed in place of the wheel 80, e.g. a brush or the like, which may be non-rotatable.

Modifications and variations of the above-described embodiments can be adopted without departing from the scope of the invention as defined in the appended claims. For example, in the present embodiment, while there is a multi-function motor responsible for the additional functions of cassette loading, tape loading, and pinch roller actuation, it will be appreciated that the multi-function motor may in practice be responsible for more functions, or a subset of these additional functions.

What is claimed is:

1. Tape recording and playback apparatus including a cleaning assembly having a cleaning means operable to clean the periphery of a helical scanning drum of said apparatus by contact therewith, the cleaning means being mounted for controllable movement into and out of contact with the periphery of the helical scanning drum, the assembly further comprising contact control means coupled to the cleaning means for controlling movement of the cleaning means into contact with the periphery of the helical scanning drum, the contact control means comprising a cam means including a cam-driving motor and a motor-driven cam, said cam means being operable to displace the cleaning means to make contact with the periphery of the helical scanning drum, said motor being a multi-function motor additionally utilisable for one or more of the additional functions of motor-driven loading of a tape cassette holding a length of magnetic tape, dragging a length of tape from the cassette into contact with the periphery of the helical scanning drum, and moving a pinch roller to pinch a portion of the tape against a tape-driving capstan forming part of the apparatus, such movements being effected by mechanisms coupled with the motor-driven cam, characterised in that said cam means is operable to displace the cleaning means independently of said additional functions.

2. Apparatus as claimed in claim 1 characterised in that said cam means is arranged to operate intermittently to cause the cleaning means to make intermittent contact with the periphery of the helical scanning drum.

3. Apparatus as claimed in claim 2 characterised in that the cleaning means is mounted on movable mounting means which comprises an arm or a bracket which is rotatable and/or slidable and which also comprises a cam follower co-operating with the cam means to be controllably moved thereby.

4. Apparatus as claimed in claim 2 characterised in that the cam-driving motor is a rotary electric motor having a rotatable output shaft, and the motor driven cam is a rotary cam directly connected to the rotatable output shaft of the cam-driving motor to be directly rotated thereby in use of the cleaning assembly.

5. Apparatus as claimed in claim 2, characterised in that the cleaning means is an abrasive cleaning means operable to clean the periphery of the helical scanning drum by a combination of physical contact therewith and relative movement therebetween.

6. Apparatus as claimed in claim 1 characterised in that the cleaning means is mounted on movable mounting means which comprises an arm or a bracket which is rotatable and/or slidable and which also comprises a cam follower co-operating with the cam means to be controllably moved thereby.

7. Apparatus as claimed in claim 6 characterised in that the cam-driving motor is a rotary electric motor having a rotatable output shaft, and the motor driven cam is a rotary cam directly connected to the rotatable output shaft of the cam-driving motor to be directly rotated thereby in use of the cleaning assembly.

8. Apparatus as claimed in claim 6, characterised in that the cleaning means is an abrasive cleaning means operable to clean the periphery of the helical scanning drum by a combination of physical contact therewith and relative movement therebetween.

9. Apparatus as claimed in claim 1 characterised in that the cam-driving motor is a rotary electric motor having a rotatable output shaft, and the motor driven cam is a rotary cam directly connected to the rotatable output shaft of the cam-driving motor to be directly rotated thereby in use of the cleaning assembly.

10. Apparatus as claimed in claim 9, characterised in that the cleaning means is an abrasive cleaning means operable to clean the periphery of the helical scanning drum by a combination of physical contact therewith and relative movement therebetween.

11. Apparatus as claimed in claim 1, characterised in that the cleaning means is an abrasive cleaning means operable to clean the periphery of the helical scanning drum by a combination of physical contact therewith and relative movement therebetween.

12. Apparatus as claimed in claim 11 characterised in that the abrasive cleaning means is an abrasive wheel mounted for free rotation about a wheel axis.

13. A method of operating tape recording and playback apparatus including a cleaning assembly having a cleaner for cleaning the periphery of a helical scanning drum of said apparatus by contact therewith, the cleaner being mounted for controllable movement into and out of contact with the periphery of the helical scanning drum, the assembly further comprising a contact controller coupled to the cleaner for controlling movement of the cleaner into contact with the periphery of the helical scanning drum, the contact controller comprising a cam arrangement including a cam-driving motor and a motor-driven cam, said cam arrangement being operable to displace the cleaner to make contact with the periphery of the helical scanning drum, said motor being a multi-function motor additionally utilisable for one or more of the additional functions of motor-driven loading of a tape cassette holding a length of magnetic tape, dragging a length of tape from the cassette into contact with the periphery of the helical scanning drum, and moving a pinch roller to pinch a portion of the tape against a tape-driving capstan forming part of the apparatus, such movements being effected by mechanisms coupled with the motor-driven cam, the cam arrangement being operable to displace the cleaner independently of said additional functions, characterised in that the method comprises the steps of controlling movement of the cleaner into contact with the periphery of the helical scanning drum upon occurrence of at least one of the following conditions:

a. upon the loading and/or unloading of a tape cassette;

b. at substantially regular intervals of time;

c. upon a data error being detected during a write cycle and/or during a read cycle;

d. upon receipt of a manually originated command signal.

14. The method of claim 13, characterised in that the movement of the cleaner provides at least one of temporary and intermittent contact with the helical scanning drum.

15. The method of claim 13 wherein the cleaner contacts the drum periphery upon the occurrence of at least two of conditions (a)–(d).

16. The method of claim 13 wherein the cleaner contacts the drum periphery upon the occurrence of at least three of conditions (a)–(d).

17. The method of claim 13 wherein the cleaner contacts the drum periphery upon the occurrence of conditions (a)–(d).

* * * * *